United States Patent [19]
Godber et al.

[11] Patent Number: 5,951,831
[45] Date of Patent: Sep. 14, 1999

[54] CONDENSATION POLYMERIZATION OF PHOSPHORUS CONTAINING COMPOUNDS

[75] Inventors: John P. Godber, Toronto; Herbert Jenkins, Milton, both of Canada

[73] Assignee: Albright & Wilson Americas Limited, Mississauga, Canada

[21] Appl. No.: 08/891,638

[22] Filed: Jul. 11, 1997

[51] Int. Cl.$^6$ .......................... C01B 53/00; C01B 25/00
[52] U.S. Cl. ............................ 204/157.43; 204/157.45
[58] Field of Search ..................... 204/157.43, 157.45

[56] References Cited

U.S. PATENT DOCUMENTS

| | | | |
|---|---|---|---|
| 1,844,420 | 2/1932 | Buttolph | 204/156 |
| 2,934,481 | 4/1960 | Ruskin | 204/157.4 |
| 3,656,897 | 4/1972 | White et al. | 23/165 |
| 3,679,560 | 7/1972 | Mezey | 204/157.1 |
| 3,682,588 | 8/1972 | Fuchs et al. | 423/315 |
| 4,671,951 | 6/1987 | Masse | 423/531 |
| 4,671,952 | 6/1987 | Masse | 423/539 |
| 4,935,114 | 6/1990 | Varma | 204/157.43 |
| 5,030,430 | 7/1991 | Michel et al. | 423/300 |
| 5,059,400 | 10/1991 | Bénézech et al. | 422/186 |
| 5,451,302 | 9/1995 | Cha | 204/157.15 |

OTHER PUBLICATIONS

Anisimova et al., "Use of Microwave Ovens for Solid–Phase Synthesis of Inorganic Phosphates", Zh. Neorg. Khim., vol. 41, No. 2, pp. 189–191. Abstract Only, no month available 1996.

Khan et al., "High Temperature Phase Transition in ADP Crystal", Indian J. of Pure and App. Phys., vol. 33, pp. 113–119, Mar. 1995.

*Primary Examiner*—Kathryn Gorgos
*Assistant Examiner*—Edna Wong
*Attorney, Agent, or Firm*—David Rogers

[57] ABSTRACT

A process of using microwave radiation to effect condensation polymerization of phosphorus oxyacids and their salts having at least two free hydroxyl groups attached to the same phosphorus atom.

25 Claims, No Drawings

CONDENSATION POLYMERIZATION OF PHOSPHORUS CONTAINING COMPOUNDS

FIELD OF THE INVENTION

This invention relates to a process for producing condensation polymers of phosphorus containing compounds.

BACKGROUND OF THE INVENTION

Many condensation polymers of phosphorus containing compounds have important industrial and commercial applications.

Phosphoric acid and phosphoric acid salts are capable of dimerizing, trimerizing and in general polymerizing to form commercially useful compounds. The condensation products contain at least one P—O—P moiety which is formed by the removal of the constituent of water from the phosphoric acid or the phosphoric acid salt monomer.

The process that is used commercially to effect this chemical reaction is known as condensation polymerization since water is generated as the monomer molecules join together. With the exception of enzymatic action on phosphates to form condensed phosphates in living organisms, the reaction is usually driven by the application of heat which causes the water that is formed in the reaction to be vaporized, and allows it to be separated from the reaction zone as steam.

In the condensation of phosphoric acid salts, the heat is usually applied by heated air generated by the combustion of fossil fuels. Hot air can be applied in various ways, for example, in a spray dryer, or in rotating kilns. The heat for the reaction may also be provided by radiant heat from the combustion of fossil fuels. In addition, heat transfer across the walls of metallic equipment from a liquid to the phosphate can be used. To aid in heat transfer, mixing of the phosphates is often necessary, usually by rotating a bed of the phosphate. The polymerization can also be effected by other methods, such as spraying directly into a flame from the combustion of fossil fuels. This partially avoids problems associated with heat transfer, but is difficult to control.

All commercially used methods of condensing phosphoric acid salts suffer from heat transfer restrictions requiring the use of large temperature differences between the heat transfer fluid and the salt being heated. For example, in the preparation of sodium hexametaphosphate, a combination of hot air and radiant heat generated by the combustion of fossil fuels is commonly used to heat a molten pool of phosphate. The heat transfer is typically poor and often as much as 80% of the heat input is wasted.

Condensed phosphoric acid is conventionally prepared either by the combustion of elemental phosphorus or by direct or indirect heating of phosphoric acid with hot gases. Elemental phosphorus is burned by reaction with oxygen followed by dissolution of the phosphorus oxides in more dilute phosphoric acid. In this process, the condensed phosphoric acid is produced without the generation of water from phosphoric acid and this process is not a condensation polymerization process. The production of elemental phosphorus is an expensive process involving the reduction of phosphate rock in a high temperature furnace. Due to inefficiencies in the process, a large amount of energy is wasted in the production of calcium silicate by-products.

The condensation polymerization of phosphoric acid is known to be possible. Using methods involving heat exchange surfaces, the maximum concentration that can be obtained is typically 100–105% expressed as the monomer $H_3PO_4$. These methods are limited by poor heat transfer at the heat transfer surface either due to precipitation of highly polymerized phosphoric acid or to the very viscous nature of the product. This reduces the rate of heat transfer to the bulk and results in a high degree of polymerization at the heat transfer surface which forms an insulating layer. For this reason, very large temperature differences between the heating fluid and the bulk of the acid are necessary to drive heat into the bulk of the acid.

Direct heating by submerged combustion devices or other devices using hot combustion gases directly can also supply the heat necessary to cause phosphoric acid to polymerize, but this suffers from limitations. Firstly, heat transfer is poor as the acid becomes more concentrated and as a result, very highly polymerized phosphoric acid results in the region close to the flame. Combustion gases containing impurities may contaminate the acid, and there is significant entrainment of acid droplets which requires expensive and sophisticated scrubbing systems. Also, there is a limitation on the ultimate strength of acid that can be obtained since the combustion fossil fuels leads to the formation of water vapour which suppresses the condensation reaction. Concentrations of approximately 105% are possible if the air used to fire the burner is dried.

A method of heating phosphoric acid by direct electrical resistance in an electrically conductive carbon containing apparatus has been described in U.S. Pat. No. 4,296,082. This process can be used to purify impure phosphoric acid through either the volatilization of impurities, the precipitation of impurities as the acid concentrates, or by their absorption onto the carbon particles resulting from the charring of organic impurities present in the phosphoric acid. The solids can be removed from the acid by filtration.

All of these processes for producing condensation polymers of phosphorus containing compounds suffer from the disadvantage that they are not energy efficient, and are thus very expensive.

Microwave heating differs from conventional forms of heating in that the heating occurs within the volume of the sample to be heated rather than at the surface. There is therefore no heat transfer medium required. The energy is transferred continuously to the entire volume of the material with high power densities. Microwaves themselves do not contain heat. Heat is generated internally by coupling of the internal motions of the atoms and molecules in the material heated to the electromagnetic field of the microwave radiation. Penetration of microwave radiation into the volume of the material to be heated can lead to high internal temperatures and temperature gradients are usually directed outwards from the centre of the material being heated. This assists in internal mass and heat transfer without any other motive force and thus there is no requirement for induced mixing of the material.

However, microwave radiation is not generally used to provide heat for industrial chemical processes as it has a reputation of being prohibitively expensive. Furthermore, it is not possible to predict in advance from a consideration of the chemical and physical properties of a material whether it will absorb sufficient microwave radiation to become hot enough to effect a chemical transformation. For example, using microwave radiation under the same conditions, $Fe_3O_4$ can be heated to 510° C. in two minutes, whereas $Fe_2O_3$ reaches a temperature of only 88° C. after thirty minutes of heating.

Microwave radiation has been used to heat dilute acids, including sulphuric acid and phosphoric acid, in order to remove free water and obtain a more concentrated acid. For example, in U.S. Pat. No. 4,671,951 to Masse, a process is disclosed for concentrating and purifying waste sulphuric acid using microwave radiation to remove free water. In this process, the microwave radiation is used to heat and remove free water, but not to effect a condensation polymerization reaction. Also, Chang in U.S. Pat. No. 5,451,302 discloses a process for the concentration of phosphoric acid using microwave heating to evaporate water. This process does not show any chemical change. Neither of these patents use microwave radiation for effecting a chemical reaction.

SUMMARY OF INVENTION

It is an object of this invention to provide an efficient method of producing condensation polymers of phosphorus containing compounds. It has been found that microwave radiation provides an efficient method of effecting condensation polymerization of a specific class of phosphorus containing compounds. Surprisingly, microwave radiation can be used to effect condensation polymerization of phosphorus containing compounds that have at least two hydroxyl atoms attached to the same phosphorus atom, but is not effective in the case of phosphorus containing compounds that do not have this characteristic.

According to the invention, a process for producing condensation polymers of phosphorus containing compounds is provided in which a compound selected from the group consisting of phosphorus oxyacids and their salts, having at least two free hydroxyl groups attached to the same phosphorus atom is subjected to microwave radiation until condensation polymerization occurs. Preferably, the compound subjected to microwave radiation has two free hydroxyl groups attached to the same phosphorus atom, and preferably, the salt is an alkaline metal, alkaline earth metal or ammonium salt.

The process of the invention may be used to convert phosphoric acid to polyphosphoric acid. In particular, the process may be used to convert phosphoric acid of 85% concentration to a concentration of 100% to 118%, to convert phosphoric acid of a concentration of 115% or less to a concentration of at least 120%, to convert phosphoric acid of a concentration of 100% or less to a concentration of about 104% to 118%, to convert phosphoric acid of a concentration of 104% or less to a concentration of about 108% to 115%, to convert phosphoric acid of a concentration of less than about 105% to a concentration of from about 108% to 125%, and in general to convert phosphoric acid of a concentration of 115% or less to a higher concentration.

The process of the invention may also be used to condense salts of phosphoric acid provided that the salts have at least two free hydroxyl groups attached to a phosphorus atom. In particular, the process can be used to convert monosodium phosphate to sodium trimetaphosphate or to sodium hexametaphosphate. When the melt is cooled slowly, ie; at room temperature over a period of about twenty minutes, the product is sodium trimetaphosphate, and when the melt is cooled rapidly, ie; in about one minute or less, the product is sodium hexametaphosphate.

Also, the process may be used to convert monopotassium phosphate to potassium trimetaphosphate, to convert phosphorous acid to polyphosphoric acid and phosphite, and to condense monocalcium phosphate.

In addition, the process may be used to condense monoammonium phosphate. When a mixture of 1:1 by weight of di-sodium phosphate and monoammonium phosphate is subjected to microwave radiation, the product is sodium hexametaphosphate. When a 1:1 by weight mixture of sodium carbonate and monoammonium phosphate is subjected to microwave radiation, the product is a mixture of tetrasodium pyrophosphate, sodium tripolyphosphate and sodium hexametaphosphate. When monoammonium phosphate alone is subjected to microwave radiation, the products obtained are ammonia and polyphosphoric acid.

Microwave radiation is a form of electromagnetic radiation like visible light or radio. The microwave region of the electromagnetic spectrum is considered to span the frequency of from about 300 MHz to 30,000 MHz, and lies between the infrared and the VHF portion of TV and FM radio. The region of the spectrum that is allowed for commercial applications is quite narrow. The only frequencies permitted in North and South America are 915 MHz and 2450 MHz. Domestic microwave ovens operate at 2450 MHz. In Western Europe, 896 MHz is generally used, and in Japan 100 to 450 kHz or 40 to 50 MHz is generally used. A frequency of between 896 MHz and 2450 MHz may be used to advantage in the process of this invention, and frequencies of about 915 MHz and of about 2450 MHz have been found to be particularly suitable.

The process may be operated either as a batch process or as a continuous process. As a general rule, in the case of phosphoric acid salts that are solid at room temperature, it is more convenient to use a batch process in small scale operations. Liquids are generally more conveniently heated in a continuous process in either small scale or large scale operations.

When a batch process is used, the phosphorus containing compounds may be subjected to microwave radiation in a chamber to which the microwave radiation is fed for a sufficient amount of time for the reaction to be completed and collecting the condensed product. The phosphorus containing compound may be heated either within a microwave transparent container or vessel, or it may be heated within the chamber itself depending upon which is more convenient. Materials which are microwave transparent are known to those skilled in the art, and are materials of a low dielectric loss constant. Examples of such materials are quartz, alumina and Teflon, among others.

In a continuous process for heating phosphoric acid, the acid may be fed continuously through a microwave applicator to interact with the microwave radiation. The acid is fed to a suitable applicator that allows the evolution of steam and collection of condensed acid and condensed steam.

The use of microwave radiation to effect condensation polymerization is commercially advantageous because, by avoiding traditional heat transfer methods, it is not necessary to provide equipment for handling the heat transfer media, and it is not necessary to provide for mixing. Also, the use of microwave energy is very efficient. The energy efficiency has been measured by determining the dielectric loss constant variation with temperature and concentration. In both cases, the energy efficiency is close to 100% which means that almost all of the energy goes towards effecting the desired reaction.

DETAILED DESCRIPTION OF INVENTION

The following examples illustrate the use of the invention to effect condensation polymerization of phosphorus containing compounds. Examples I to IX relate to the condensation polymerization of phosphoric acid, and examples X to XX relate to the condensation polymerization of phosphoric acid salts.

Phosphoric Acid

Examples I to IX illustrate the use of the invention to effect condensation polymerization of phosphoric acid. The degree of polymerization of the phosphoric acid is expressed as a percentage concentration of phosphoric acid as is conventionally done by those skilled in the art. The higher the concentration, the higher the degree of polymerization. Examples I and II relate to batch processes and examples III to IX to continuous processes.

(a) Batch Process

The apparatus used in examples I and II was a domestic microwave oven with an opening in one of the walls. The microwave oven operated at a nominal frequency of 2450 MHz. The phosphoric acid to be polymerized was placed in a quartz round bottom flask with an outlet at the top which was connected through the wall of the microwave oven. The quartz outlet was then attached to a condenser which was attached to a water aspirator to provide a source of vacuum. The vacuum was applied and the microwave oven was turned on. The phosphoric acid began to boil immediately and water was transported in the vapour phase to the condenser where it condensed and fell into a collection flask. The final concentration of the polymerized acid that was obtained depended on the time the microwave oven was on and the initial mass of phosphoric acid.

EXAMPLE I

In the apparatus described, 300 g of 85% phosphoric acid was exposed to microwave radiation for 50 minutes. This yielded a product with a concentration of 106% phosphoric acid.

EXAMPLE II

In the same apparatus, 200 g of phosphoric acid of 115% concentration was placed in the quartz round bottom flask and heated for about 30 minutes. The product had a concentration of 120.7% phosphoric acid.

(b) Continuous Process

Examples III to IX illustrate the condensation polymerization of phosphoric acid in a continuous process. In examples III to V, a domestic microwave oven was used, and in examples VI to IX a tunable microwave oven was used.

Microwave Oven

In the apparatus used in examples III to V, a quartz pipe was passed directly through a domestic microwave oven operating at a nominal frequency of 2450 MHz. A connection to the quartz pipe was made at one end to allow phosphoric acid to be pumped into the pipe. A connection was made at the other end of the pipe to allow the vapors to be condensed and collected and to collect the product. The condenser was attached to a vacuum pump. Once the phosphoric acid began to be fed to the quartz pipe, the microwave oven was turned on. The product was collected at the exit end of the pipe and the vapors that were released were condensed. Different concentrations of polymerized phosphoric acid were produced depending on the feed rate of the phosphoric acid.

EXAMPLE III

When 99.8% phosphoric acid was fed at a rate of 13 g per minute, the product obtained had a phosphoric acid concentration of 104.1%.

EXAMPLE IV

When phosphoric acid of 104.1% concentration was fed at a rate of 6 g per minute, the product obtained had a phosphoric acid concentration of 108.0%.

EXAMPLE V

When phosphoric acid of 104.2% concentration was fed at a rate of 2.7 g per minute, the product obtained had a phosphoric acid concentration of 116.8%.

Tunable Microwave Oven

The apparatus used in examples VI to VIII allowed microwave radiation entering at a frequency of 2450 MHz to be tuned to the dielectric properties of the phosphoric acid feed in order to maximize the energy absorption. A four stub tuner located between a microwave generator and an applicator was used to tune the microwave radiation to the phosphoric acid. The phosphoric acid was fed into one end of the applicator and exited at the other. The applicator had the shape and dimensions of a microwave wave guide open at one end to allow microwave radiation to enter and having a small opening at the opposite end to allow the concentrated acid to exit the applicator. An opening in the top of the applicator was connected to a condenser which allowed the vapors released to be separated from the hot phosphoric acid and condensed. Phosphoric acid fed to this applicator could be concentrated to any desired strength. In this apparatus, heating of the acid, polymerization of the acid and evaporation of volatile species took place in the same vessel for convenience, but other apparatus of this type could be used in which the heating and evaporation are accomplished in two separate vessels.

EXAMPLE VI

85% phosphoric acid was fed to the applicator at a rate of 1.6 kg/hour while 2 kW of microwave radiation was applied to the applicator. The microwave radiation was tuned to the acid so as to minimize (reduce to less than 5%) the amount of reflected power. The system was operating under a vacuum and the pressure was 375 mm Hg. The product obtained had a phosphoric acid concentration of 111%.

EXAMPLE VII

Using the same conditions as in example VI, when 105% phosphoric acid was fed to the applicator, the product had a phosphoric acid concentration of 118%.

EXAMPLE VIII

Using the same conditions as in example VI, when 105% phosphoric acid was fed to the applicator at lower flow rates, the product obtained had a phosphoric acid concentration of 125%.

EXAMPLE IX

Using a nominally 915 MHz microwave generator and an applicator similar to the one used in Examples VI to VIII, 80% phosphoric acid was fed at a rate of 112 kg/hr while approximately 66 kW of microwave power was applied. The system operated under a vacuum and the total pressure was 300 mm Hg. The product obtained had a concentration of 118%.

Phosphoric Acid Salts

Examples X to XX illustrate the use of the invention in the condensation polymerization of phosphoric acid salts. In examples XIV to XX, the salt starting material has at least two free hydroxyl groups attached to the same phosphorus atom, whereas the salts used as starting materials in examples X to XIII do not have at least two free hydroxyl groups attached to the same phosphorus atom. The examples illustrate that while condensation polymerization takes place using the former starting materials, there is little or no reaction when the latter starting materials are used. The same apparatus was used in each of examples X to XX.

Apparatus Used

A domestic microwave oven operating at nominally 2450 MHz was used to heat samples in an open fused quartz crucible.

Salts With Less Than Two Free Hydroxyl Groups

In examples X to XIII, the salts used did not have at least two free hydroxyl groups attached to the same phosphorus atom, and little or no reaction was observed.

EXAMPLE X

Sodium Acid Pyrophosphate

Sodium acid pyrophosphate was exposed to microwave radiation for prolonged periods of time, and no change in the material was observed.

EXAMPLE XI

Di-sodium phosphate (anhydrous)
Di-calcium phosphate (anhydrous)
Di-ammonium phosphate The di-substituted ortho phosphate salts were exposed to microwave radiation for prolonged periods of time. There was a slight warming, but none became "hot", and the slight warming observed was apparently due to heating of physically absorbed or chemically bound water.

EXAMPLE XII

Sodium hexametaphosphate
Sodium trimetaphosphate

Under prolonged exposure to microwave radiation, neither of these compounds reacted. Sodium hexametaphosphate absorbed radiation slightly to become warm, and this probably occurred because of the presence of some moisture.

EXAMPLE XIII

Hydrated sodium phosphite

Hydrated sodium phosphite (Na(OH) (HPO$_2$.2.5H$_2$O) was subjected to microwave radiation for 10 minutes. The temperature reached immediately after the heating began was 80° C. The sample appeared to melt. The melting point of sodium phosphite is 42° C. when it melts in its own water of crystallization. Ion chromatographic analysis of the product showed that no transformation of the phosphite had occurred. There was no phosphate present.

With at Least Two Free Hydroxyl Groups

Examples XIV to XX illustrate that a condensation polymerization reaction takes place when the starting material has at least two hydroxyl groups attached to a phosphorus atom.

EXAMPLE XIV

Monosodium Phosphate

Exposure of monosodium phosphate to microwave radiation resulted in the production of sodium trimetaphosphate when the melt was cooled at room temperature for twenty minutes. Inspection of the infrared traces showed that monosodium phosphate was transformed to sodium trimetaphosphate essentially quantitatively under microwave heating. The infrared traces of monosodium phosphate were not present while the complex spectrum of sodium trimetaphosphate was shown to result after the heating. Ion chromatographic analysis of the product showed it to be substantially more than 99% sodium trimetaphosphate with some traces of tripolyphosphate present.

If the melt produced by microwave induced condensation polymerization of monosodium phosphate is cooled rapidly in one minute or less, sodium hexametaphosphate can be collected as the product substantially free of sodium trimetaphosphate.

EXAMPLE XV

Monopotassium phosphate

When monopotassium phosphate was exposed to microwave radiation, the product obtained was potassium trimetaphosphate and the transformation was very clean.

EXAMPLE XVI

Monocalcium phosphate-1

When monocalcium phosphate-1 was exposed to microwave radiation it became very hot. The temperature rose so quickly that the thermal shock caused any glassware, even fused quartz to crack. It reached such a high temperature that Pyrex glassware in contact with the phosphate melted. It was difficult to analyze the material that was produced. The product was insoluble in hot aqua regia, however, alkali fusion led to a soluble material which could be analyzed. The results showed that the product contained 26% Ca and 73.9% P$_2$O$_5$ indicating that the product was calcium polyphosphate.

EXAMPLE XVII

Phosphorous acid

When phosphorous acid (H$_3$PO$_3$) was exposed to microwave radiation, the phosphorous acid immediately became hot. The production of phosphine (PH$_3$) was immediately apparent because of the characteristic odor. After heating, an orange-red deposit, stable in the air was found on the top edge of the container. A translucent, glassy looking solid was found on the bottom of the crucible of the container. This was analyzed for the presence of phosphite and none was found. After dissolution in water, only polyphosphoric acid was found.

EXAMPLE XVIII

Monoammonium phosphate

When monoammonium phosphate was subjected to microwave radiation, the phosphate heated rapidly. Almost immediately after turning on the microwave oven, the monoammonium phosphate melted and began to boil. Analysis of the gas that was released showed it to be a mixture of both ammonia and water. Monoammonium phosphate is composed of 14.7% NH$_3$ and 61.69% P$_2$O$_5$. After microwave heating for 10 minutes, the glassy material that was formed contained 4.1% NH$_3$ and 77.2% P$_2$O$_5$. In the heating of monoammonium phosphate temperatures are reached that exceed the decomposition temperature of ammonia in the presence of phosphoric acid. Thus, ammonia is released, forming phosphoric acid. This is polymerized to polyphosphoric acid. The melting point of monoammonium phosphate is 190° C. and this temperature was reached very quickly.

EXAMPLE XIX

Di-sodium phosphate and
Monoammonium phosphate

A 1:1 mixture (by weight) of di-sodium phosphate and monoammonium phosphate was heated using microwave radiation. A glassy product was obtained which indicated that the material had gone through a molten state. The infrared spectrum of the product is almost superimposable on a spectrum of sodium hexametaphosphate shifted to lower energy. This energy shift is consistent with the fact that this polyphosphate is an acidic sodium hexametaphosphate. The Na/P mole ratio of the starting material is 0.9.

This is therefore a useful way to prepare acidic sodium hexametaphosphate.

EXAMPLE XX
Monoammonium phosphate and
Sodium carbonate

A mixture of monoammonium phosphate and sodium carbonate having an Na/P mole ratio of 5/3 was prepared by sifting together monoammonium phosphate powder and sodium carbonate powder. This was heated using microwave radiation for five minutes. The product was a mixture of 48.5% tetrasodium pyrophosphate, 36.1% sodium tripolyphosphate and 11.1% sodium hexametaphosphate.

We claim:

1. A process for producing condensation polymers of phosphorus containing compounds, in which a compound selected from the group consisting of phosphoric acid, monosodium phosphate, phosphorous acid, monoammonium phosphate, and monocalcium phosphate is subjected to microwave radiation until condensation polymerization occurs.

2. A process as claimed in claim 1, in which the compound subjected to the microwave radiation is phosphoric acid.

3. A process as claimed in claim 1, in which the compound subjected to the microwave radiation is phosphoric acid of 85% concentration, and it is subjected to the microwave radiation until a concentration of 100% to 118% phosphoric acid is obtained.

4. A process as claimed in claim 1, in which the compound subjected to the microwave radiation is phosphoric acid of a concentration of 115% or less, and it is subjected to the microwave radiation until a concentration of at least 120% phosphoric acid is obtained.

5. A process as claimed in claim 1, in which the compound subjected to the microwave radiation is phosphoric acid of a concentration of 100% or less, and it is subjected to the microwave radiation until a concentration of about 104% to 118% is obtained.

6. A process as claimed in claim 1, in which the compound subjected to the microwave radiation is phosphoric acid of a concentration of about 104% or less, and it is subjected to the microwave radiation until a concentration of about 108% to 115% is obtained.

7. A. process as claimed in claim 1, in which the compound subjected to the microwave radiation is phosphoric acid of a concentration of less than about 105%, and it is subjected to the microwave radiation until a concentration of about 108% to 125% is obtained.

8. A process as claimed in claim 1, in which the compound subjected to the microwave radiation is phosphoric acid of a concentration of less than 115% , and it is subjected to the microwave radiation to increase its concentration to a concentration above 115%.

9. A process as claimed in claim 1, in which the compound subjected to the microwave radiation is monosodium phosphate, and it is subjected to the microwave radiation until the condensation polymerization occurs and then cooled slowly to form sodium trimetaphosphate.

10. A process as claimed in claim 1, which the compound subjected to the microwave radiation is monosodium phosphate, and it is subjected to the microwave radiation until the condensation polymerization occurs and then cooled rapidly to form sodium hexametaphosphate.

11. A process as claimed in claim 1, in which the compound subjected to the microwave radiation is phosphorous acid, and it is subjected to the microwave radiation until polyphosphoric acid and phosphine are obtained.

12. A process as claimed in claim 1, in which the compound subjected to the microwave radiation is monoammonium phosphate.

13. A process as claimed in claim 1, in which a 1:1 by weight mixture of disodium phosphate and monoammonium phosphate is subjected to the microwave radiation until sodium hexametaphosphate is obtained.

14. A process as claimed in claim 1, in which a 1:1 by weight mixture of sodium carbonate and monoammonium phosphate is subjected to the microwave radiation until a mixture of tetra sodium pyrophosphate, sodium tripolyphosphate and sodium hexametaphosphate is obtained.

15. A process as claimed in claim 1, in which monoammonium phosphate is subjected to the microwave radiation until ammonia and polyphosphoric acid are obtained.

16. A process as claimed in claim 1, in which the compound subjected to the microwave radiation is monocalcium phosphate.

17. A process as claimed in claim 1, in which the microwave radiation has a frequency of from about 896 to about 2450 megahertz.

18. A process as claimed in claim 1, in which the microwave radiation has a frequency of about 2450 megahertz.

19. A process as claimed in claim 1, in which the microwave radiation has frequency of about 915 megahertz.

20. A process as claimed in claim 1, in which the process is carried out continuously.

21. A continuous process for increasing the concentration of phosphoric acid by condensation polymerization in which the phosphoric acid is subjected to microwave radiation until a concentration of phosphoric acid of above 100% is obtained.

22. A process as claimed in claim 21 in which the microwave radiation has a frequency of from about 896 to about 2450 megahertz.

23. A process as claimed in claim 21 in which the microwave radiation has a frequency of about 2450 megahertz.

24. A process as claimed in claim 21 in which the microwave radiation has a frequency of about 915 megahertz.

25. A process as claimed in claim 21 in which the phosphoric acid subjected to the microwave radiation has a concentration of from about 85% to 100%.

* * * * *